United States Patent [19]

Else et al.

[11] Patent Number: 4,811,378
[45] Date of Patent: Mar. 7, 1989

[54] TOLL FRAUD CONTROL

[75] Inventors: Richard L. Else, Glen Ellyn; Kenneth D. Frantzen, Winfield, both of Ill.

[73] Assignee: American Telephone and Telegraph Company, AT&T Bell Laboratories, Murray Hill, N.J.

[21] Appl. No.: 218,435

[22] Filed: Jul. 8, 1988

Related U.S. Application Data

[63] Continuation of Ser. No. 901,959, Aug. 29, 1986, abandoned.

[51] Int. Cl.⁴ ............................................. H04M 3/00
[52] U.S. Cl. ...................................... 379/189; 379/197
[58] Field of Search ............... 379/189, 196, 197, 198, 379/208, 250, 95, 145, 112, 115, 116, 121, 199, 200

[56] References Cited

U.S. PATENT DOCUMENTS

| | | | |
|---|---|---|---|
| 3,952,160 | 4/1976 | Pasternack et al. | 379/199 X |
| 4,182,934 | 1/1980 | Keys et al. | 379/189 |
| 4,284,851 | 8/1981 | Schweitzer et al. | 379/189 |
| 4,540,850 | 9/1985 | Herr et al. | 379/204 X |

OTHER PUBLICATIONS

Bruce E. Briley, Introduction to Telephone Switching, 1983, pp. 71-76.
C. Breen et al., "Signaling Systems for Control of Telephone Switching", the *Bell System Technical Journal*, vol. 39, No. 6, Nov., 1960, pp. 1381-1443.
"New Wrinkle Aims To Frustrate Those Who Attempt Fraud", HQ vol. III, No. 24, Nov. 4, 1985, p. 5.
*Bell Labs News*, vol. 25, Issue No. 44, Dec. 9, 1985, p. 3.

*Primary Examiner*—James L. Dwyer
*Attorney, Agent, or Firm*—R. J. Godlewski

[57] ABSTRACT

A system and method are disclosed for automatically disabling call communications through a switching system until answer supervision is received for the call. A four-wire switching system includes a fraud control unit which disables communications over the established transmit portion of a four-wire call connection through the switching system and prevents normal communications from a calling to a called line. However, normal call progress signals are allowed to pass on the established receive portion of the call connection from the called to the calling line. The fraud control unit includes a generator for generating idle code and a selector for inserting either the idle code from the generator or caller communications on the transmit portion of the call connection from the calling to the called line. The selector is controlled by a selector control unit under the control of the central processor of the switching system. When answer supervision is received for the call, the central processor causes the fraud control unit to remove the disabling of communications on the transmit path so that normal communication may proceed from the calling to the called line.

25 Claims, 4 Drawing Sheets

4,811,378

TOLL FRAUD CONTROL

This application is a continuation of application Ser. No. 901,959, filed Aug. 29, 1986 now abandoned.

CROSS-REFERENCE TO RELATED APPLICATION

This application is related to the application of H. A. Kerr, entitled "Toll Fraud Control Override", filed concurrently with this application.

TECHNICAL FIELD

This invention relates to communication switching systems and particularly to a method of and a system for precluding call communications from propagating through a telephone network until valid answer supervision is received for the call.

BACKGROUND OF THE INVENTION

An industry has grown and flourished in both advising and achieving the placing of telephone calls on a fraudulent basis through telephone switching systems, particularly in the toll interconnect network. Such an industry is known as "blue box" and "black box" fraud.

By way of illustration, a "blue box" call involves a user originating two calls, one legitimate, the other fraudulent, to a four-wire switching system office via a communication line utilizing in-band single frequency (SF) supervisory and multiple frequency (MF) address tones. While receiving an audible ringing indication for the legitimate call, the "blue box" user applies a SF tone to the call connections to simulate a disconnect of the legitimate call to the four-wire office. The "blue box" user immediately removes the SF tone which is recognized by the four-wire office as a new call origination and then is enabled effectively to dial the fraudulent call by MF signaling over the established connection through the four-wire office. At most, the "blue box" caller pays for the first legitimate call and places the second call at a reduced rate or free of charge. Typically, the "blue box" user will initially try to place the first call to a "800" number so that the "800" number is billed for both calls. When an "800" number is unavailable, the "blue box" user will then attempt to make a flat rate call such as to an information operator.

With "black box" calls, a user connects a "black box" to a line to receive calls and circumvent billing. The "black box" accomplishes this by generating an off-hook signal on a called line just long enough to trip ringing and establish a talking path, but short enough to prevent a valid call answer signal from being returned to the originating office to bill the user for the call. In addition, more sophisticated equipment such as a private branch exchange may be configured not to return an answer signal. Whatever the equipment or method, a fraudulent call involves either avoiding or altering the billing record and charges for the call.

Such fraudulent calls have stimulated the telephone industry, particularly interconnect carriers, to design systems for minimizing the effect of "black box", "blue box", and other fraudulent calls through the telephone network. Some such designs have included the use of auxiliary techniques and special equipment for sensing the SF-MF tones which are introduced into the network by fraudulent users and to disable the attempted misuse of telephone networks when a fraudulent call has been detected. However, such designs are typically effective only to detect and disable "blue box" originated calls outgoing from a toll interconnect network office, not "blue box" calls incoming to a toll interconnect network office or "black box" calls.

Furthermore, "blue box" users have attempted to make all of the special equipment busy by a multitude of calls and overloading the system to the extent that it must let through some of the fraudulent calls. The special equipment is costly and complex, delays the completion of calls, and often involves the need for substantial software or programming effort. It also requires the telephone company, particularly an interconnect carrier, to engineer an office for a larger call handling capacity than is actually needed.

A problem of the prior art, therefore, is that no single arrangement has been found for preventing both "blue box" and "black box" calls.

SUMMARY OF THE INVENTION

The foregoing problem and associated disadvantages are solved and a technical advance is achieved in an illustrative embodiment of a switching system in a telephone interconnect network by automatically disabling communications over a call connection following the establishment thereof and removing the disabling of communications over the call connection after a valid answer signal is received to bill the user for the call.

The illustrative embodiment involves circuitry in a digital switching system which includes an idle code generator and a selector for inserting idle code advantageously into the established transmit path of a unidirectional call connection. As a result, the transmit path is placed in a noncommunicative state, and the transmission of communications from a calling to a called line is precluded. The processor of the system assigns or allocates separate transmit and receive paths to serve the call. Furthermore, the idle code generator and selector are advantageously included in the switching network of the system and, in particular, the time slot interchange unit of the switching network to minimize additional circuitry, control software, and path setup time. A selector control unit, which is activated by the program-controlled processor, controls the operation of the selector. The invention eliminates the need for costly special equipment that first detects SF and MF tones and then kills the call after detecting the fraudulent use.

One of the significant advantages of this invention is that the illustrative method utilized in a switching system virtually eliminates "blue box" and "black box" fraud calls by maintaining the established received portion of a call connection in a communicative state and automatically placing the established transmit path of the call connection in a noncommunicative state until a valid answer signal is received to bill the user for the call. Prior art arrangements utilizing the SF-MF designs at the toll interconnect network were successful for warding off "blue box" calls, but were not equipped to solve the "black box" problem.

In a program-controlled switching system embodiment of this invention, a processor activates an idle code generator to supply idle code to an established transmit path thereby disabling communications during the initial signal processing toward the called line. This precludes the "blue box" user from sending any SF-MF signaling tones to originate fraudulent calls through the network. Additionally, communications are disabled on the established transmit path to preclude the transmission of communications from the caller to the called party until valid answer supervision is received for the call and verified at the caller destination. This prevents the "black box" user from hearing any caller communication until valid answer supervision is returned. However, in the illustrative embodiment, the receive path from the called to the calling line is assigned by the processor and established to serve the call, and communications propagate in the normal manner to permit the caller to receive call progress signals or dialing instructions while the call remains in the unanswered state.

After receipt of valid answer supervision, the fraud control unit including the idle code generator, selector, and controller under the control of the processor advantageously withdraws idle code from the transmit path to place the path in a communicative state which enables the transmission of communications from the caller towards the called destination.

Another aspect of this invention is that the unidirectional paths of a call connection may also be established independently of one another. Upon receipt of a call from a calling line, a receive path is first established to allow normal call progress signals to be returned to the caller. After a valid answer signal is returned for the call, a transmit path is then established for the transmission of communications from the calling to the called line. This method also prevents fraudulent use of the toll interconnect network without first establishing both transmit and receive paths and then disabling communications over the established transmit path.

DETAILED DESCRIPTION

Figure 1:
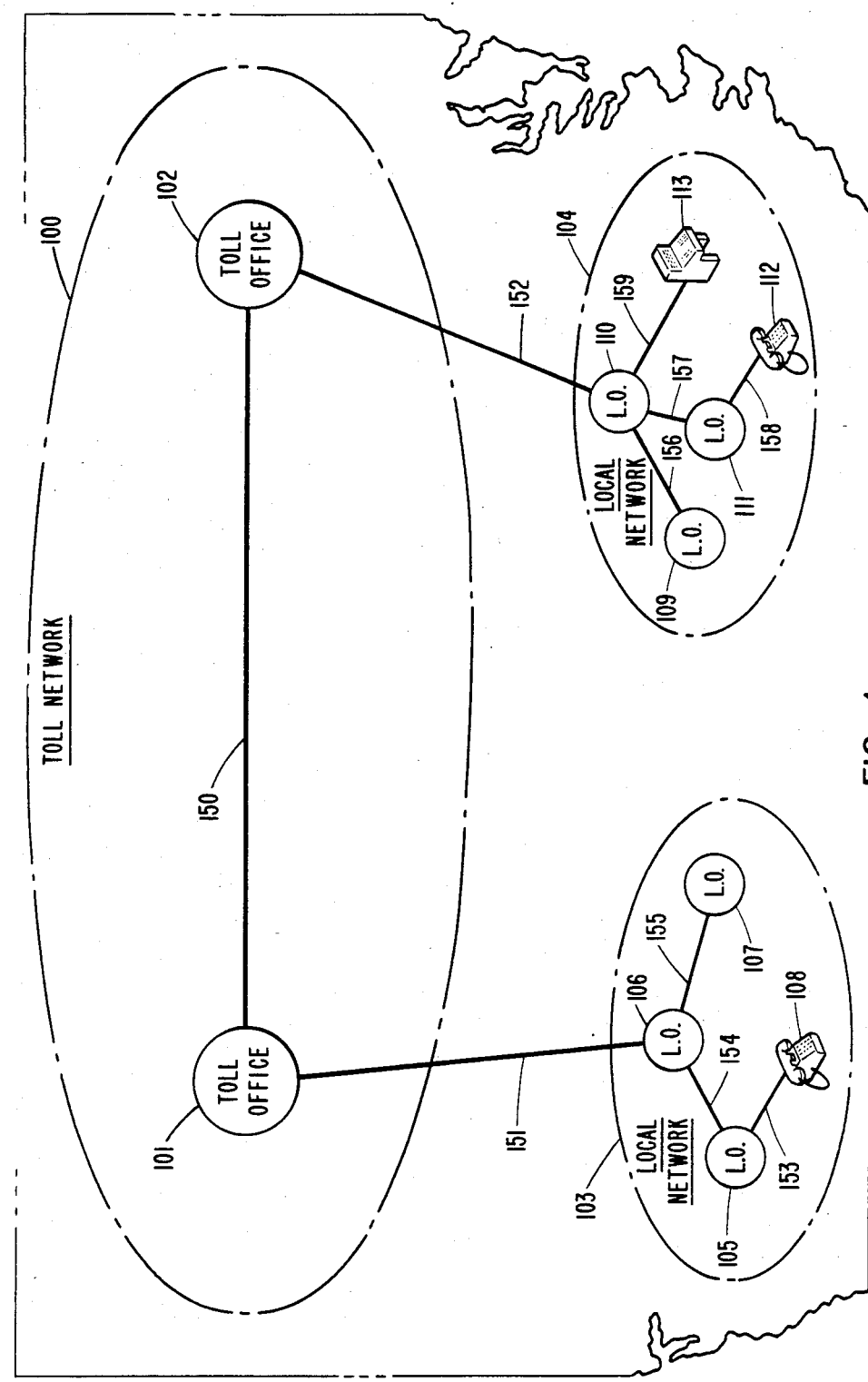
FIG. 1 depicts an illustrative interconnect carrier network interconnecting two local exchange carrier networks.

Depicted in FIG. 1 is an illustrative toll interconnect carrier network 100 including a plurality of communication lines such as well-known four-wire trunk group 150 interconnected by a plurality of toll switching system offices such as 101 and 102 for serving a plurality of local exchange carrier networks such as 103 and 104 via four-wire trunk groups 151 and 152, respectively.

Each communication line in a four-wire trunk group, includes circuitry and transmission facilities for establishing two unidirectional call connection paths between a calling and a called line. One of the two unidirectional call connection paths designated the transmit portion or path facilitates the transmission of communications in only one direction from the calling to the called line, whereas the other unidirectional call connection path designated the receive portion or path facilitates the transmission of communications in the opposite direction from the called to the calling line.

Each of the toll offices in interconnect network 100 includes an illustrative switching system for and utilizes an illustrative method of processing calls and, in particular, preventing fraudulent calls such as well-known "blue box" and "black box" calls from propagating through the toll network. The use of these so-called "blue boxes" and "black boxes" by unscrupulous individuals avoids or alters the generation of records to correctly bill for the call when calling through the toll network. A more sophisticated form of abuse employs "intelligent" equipment such as a private branch exchange (PBX) or answering machines programmed not to return an answer supervisory signal which initiates a billing record typically at the originating office. The illustrative system and method utilized in toll offices 101 and 102 prevents fraudulent calls by disabling communications over an established transmit path from the calling to the called line until a valid "answer supervision" signal is received for the call. Communications are maintained on the established receive path from the called to the calling line so that the caller will hear all of the normal network signals such as ringing, busy, or recorded announcements, but the disabled communications on the transmit path make it impossible for the caller to be heard by the person at the called line. Consequently, both the caller and the called customer are frustrated, causing them typically to hang up.

Local network 103 includes a plurality of local exchange telephone switching system offices such as 105–107 which in turn serve a plurality of customers such as one at telephone station set 108 connected to local telephone office 105 via well-known two-wire communication line 153. In addition, one or more of the local offices such as 106, commonly known as an access tandem, may be used to interconnect other local offices such as 105 and 107 via trunk groups 154 and 155, respectively. Similarly, local network 104 includes a plurality of local switching system offices such as 109–111 which in turn serves customers at, for example, customer station set 112 and private branch exchange 113 interconnected as shown by communication lines 156–159.

By way of example, each of local telephone offices 105–107 and 109–111 may suitably be an electronic program-controlled switching system such as the 1A ESS TM switch available from AT&T. This switch is disclosed in U S. Pat. No. 3,570,008, issued to R. W. Downing et al., on Mar. 19, 1971, and similarly disclosed in *The Bell System Technical Journal*, Vol. 43, No. 5, Parts 1 and 2, September, 1964. An updated central processor suitable for use in this switching system is described in *The Bell System Technical Journal*, Vol. 56, No. 2, February, 1977. These references may be consulted for a more comprehensive understanding of the construction and operation of an electronic program-controlled local switching system office.

Each of toll switching system offices 101 and 102 is suitably an electronically program-controlled switching system such as the 4ESS TM digital switch also available from AT&T. This digital switch is described in detail in *The Bell System Technical Journal*, Vol. 56, No. 7, September, 1977 and Vol 60, No. 6, Part 2, July-August, 1981. These references may be consulted for a comprehensive understanding of the construction and operation of a toll switching system. Toll switching system offices such as 101 and 102 selectively interconnect individual trunks in response to routing information such as the telephone number of a called customer line received from a local office.

Figure 2:
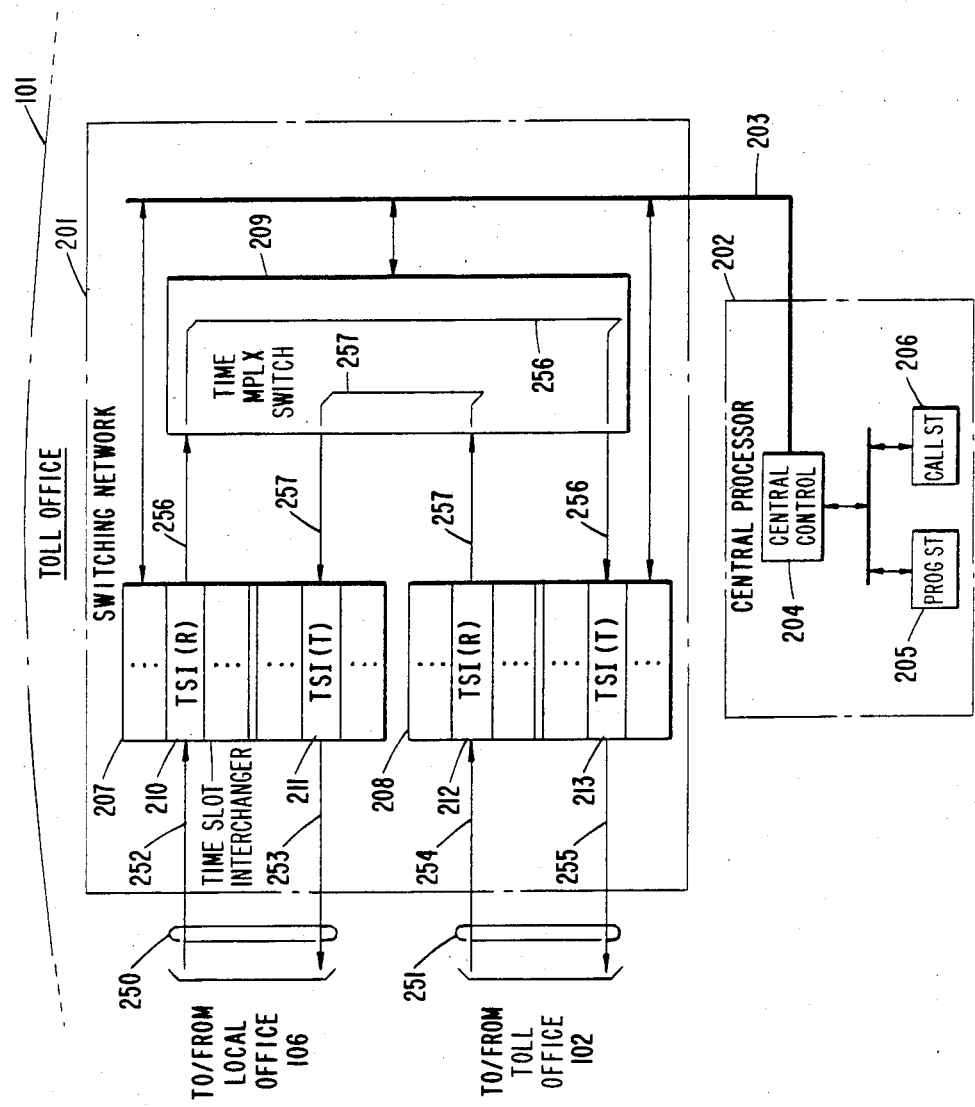
FIG. 2 is a block diagram of an illustrative toll switching system office included in the interconnect carrier of FIG. 1.

Depicted in FIG. 2 is a block diagram of toll switching system 101 which includes switching network 201 and central processor 202 interconnected by peripheral unit bus 203. The switching network interconnects the incoming and outgoing four-wire unidirectional call connection paths of communication lines such as 250 and 251 in respective trunk groups 150 and 151 under the control of program-controlled central processor 202. The central processor includes central control 204, a number of well-known program memories such as program store 205 for storing program instructions that control the operation of the switch, and a number of well-known data memories such as call store 206 for storing temporary call data and translations information.

The majority of the logic, control, and translations functions required for the operation of the toll switching system are performed by central processor 202. In response to a call, the central processor assigns or allocates separate transmit and receives paths to serve the call. A typical processor suitable for use in the illustrative toll switching system is described in *The Bell System Technical Journal*, Vol. 56, No. 2, February, 1977.

Central control 204 is the information processing unit of the system and executes the program instructions resident in program store 205 using the call processing data in call store 206.

Switching network 201 has a time-space-time switching configuration utilizing time slot interchange (TSI) units such as 207 and 208 and time multiplex switch (TMS) unit 209. Time slot interchange unit 207 includes a plurality of well-known switching and permuting circuits such as 210 for receiving data via serial DS-120 format unidirectional incoming path 252. In addition, time slot interchange unit 207 includes another plurality of switching and permuting circuits such as 211 for performing the final space and time switching function before transmitting the data on serial DS-120 format unidirectional outgoing path 253. Similarly, time slot interchange unit 208 includes a plurality of switching and permuting circuits such as receive circuit 212 and transmit circuit 213 for receiving and transmitting data on respective unidirectional incoming and outgoing paths 254 and 255.

Time multiplex switch 209 is a well-known two-stage space division switch for interconnecting the receive and transmit circuits of time slot interchange units 207 and 208. As shown in the transmit portion of the four-wire call connection from calling line 153 to called line 158 via interconnecting lines 250 and 251 of FIG. 2, TMS path 256 connects incoming path 252 and receive circuit 210 to transmit circuit 213 and outgoing path 255. In the receive portion of the call connection in the opposite direction from the called to the calling line, TMS path 257 connects incoming path 254 and receive circuit 212 to transmit circuit 211 and outgoing path 253. Call connections through switching network 201 are established under the control of central processor 202 via peripheral unit bus 203.

Figure 3:
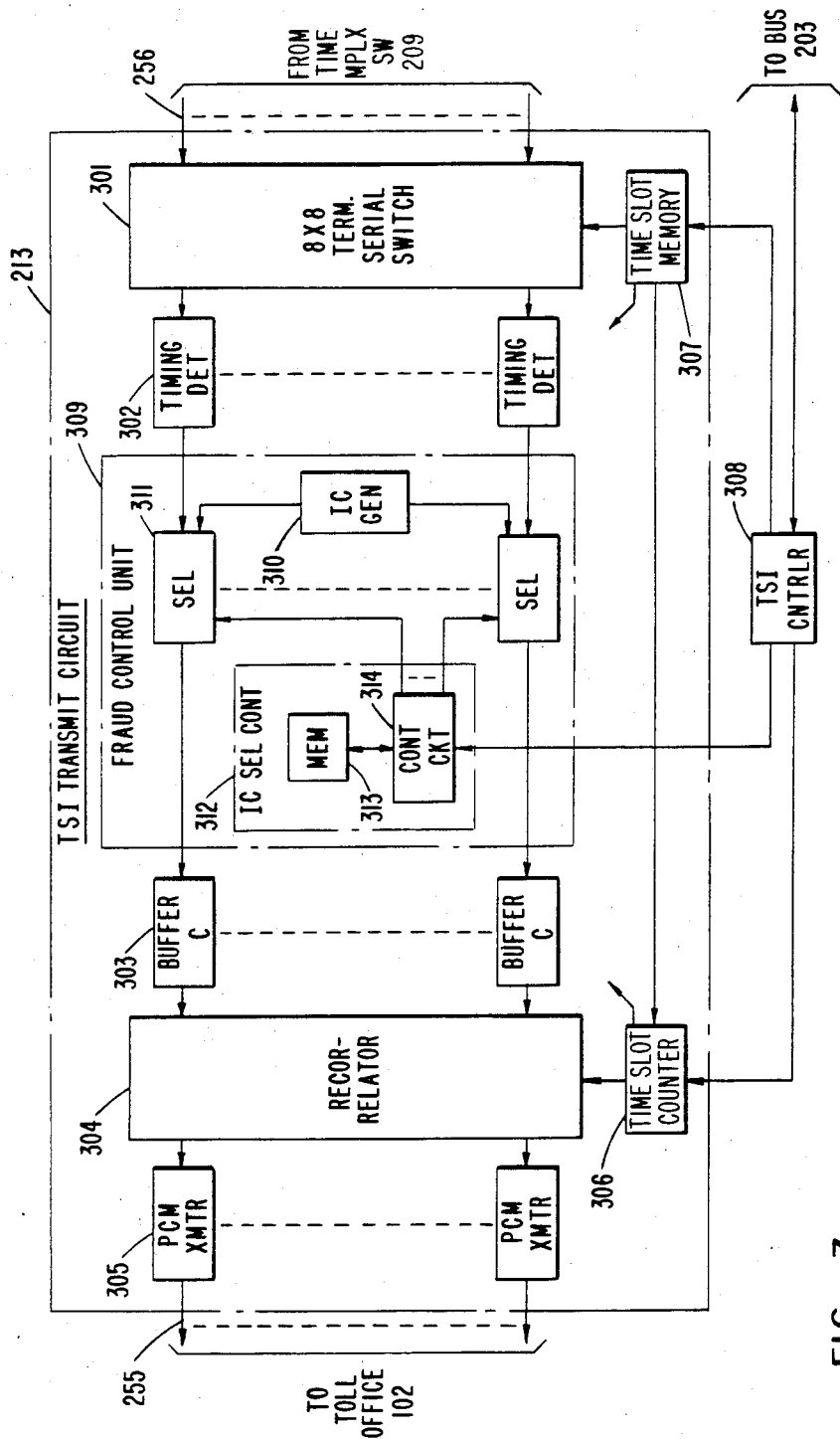
FIG. 3 is a block diagram of a fraud control unit in the transmit portion of a switching and permuting circuit of the switching system of FIG. 2.

Depicted in FIG. 3 is transmit circuit 213 of time slot interchange unit 208. This well-known transmit circuit described in the previously cited *Bell System Technical Journal*, of September, 1977, includes 8×8 terminating serial switch 301, a plurality of timing detectors such as 302, a plurality of buffer memories such as 303, a recorrelator 304, and a plurality of PCM transmitters such as 305 all under the control of time slot counter 306, time slot memory 307, and time slot interface controller 308 interconnected as shown. Interconnected between each of the timing detectors and the buffer memories is fraud control unit 309 also under the control of TSI controller 308. This fraud control unit includes generator 310 for generating idle code for each of the outgoing transmit paths served by the outgoing transmit circuit and a plurality of selector circuits such as 311 selectively operable for directing and inserting either the idle code from the generator or the communications on the transmit path from the caller into buffer memory 307 for the final stage of time division switching. Each selector is controlled by idle code selector control unit 312 which is under the control of central processor 202 via the TSI controller 308. Selector controller 312 includes a well-known busy/idle memory map in memory 313 for storing the busy/idle state of each path served by transmit circuit 213 and well-known control circuitry 314 for indicating the stored state of a path to the associated selectors. For example, when an idle state is indicated by controller 312, selector 311 directs and inserts the idle code from generator 310 into buffer memory 303 indicative of an idle or noncommunicative state of the path. When selector controller 312 indicates a busy or communicative state, selector 311 inserts the communications on path 256 from the caller into buffer memory 303 for transmission on one of the outgoing paths such as outgoing transmit path 255.

When a call for a four-wire call connection is received by toll office 101, switching network 201 under the control of central processor 202 establishes two unidirectional call connection paths that are assigned or allocated by the central processor to serve the call. To prevent calls including fraudulent ones from propagating through toll office 101, central processor 202 sends an order to fraud control unit 309 to disable communications on the established transmit path from the calling to the called line. As a result, the established transmit path is maintained in a noncommunicative state. This is accomplished by setting the state of the transmit path in the busy/idle memory map of selector control 312 to idle. When this idle state is indicated, selector 311 directs and inserts idle code from generator 310 into buffer memory 303 rather than communications on TMS path 256 from the caller when in the busy state. Thus, any communication from the calling to the called line is prevented until a valid answer signal is received from the called line. Since the established receive path is maintained in a communicative state, call progress tones such as ringing, busy, or recorded announcements will all be heard by the caller. However, with the communications disabled on the established transmit path, it is impossible for the caller to be heard by the person at the called line or for a "blue box" user to forward signals until a valid answer signal is returned for the call.

When a valid answer supervision is returned to the toll office, as with most legitimate calls, the central processor sets the busy/idle map for the call in selector control 312 to the busy state. Selector 311 responds by inserting the communications on TMS path 256 from the caller into buffer memory 303 which is then switched onto outgoing path 255 to the called line. When answer supervision is not returned such as in the case of a fraudulent call, idle code is continually inserted into outgoing transmit path 255 from the calling to the called line thereby maintaining the established transmit path in a noncommunicative state.

Figure 4:
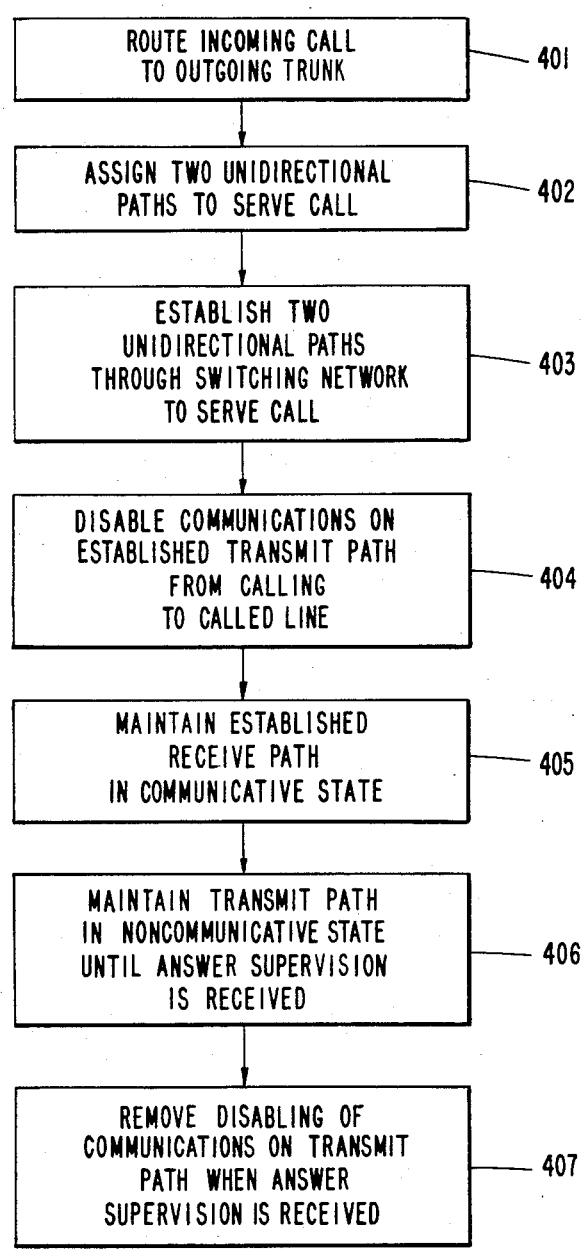
FIG. 4 depicts an illustrative method for processing calls through the switching system of FIG. 2.

Depicted in FIG. 4 is a flow chart illustrating the method of processing calls and, in particular, preventing the completion of calls through a toll switching system office until a valid answer supervisory signal is received for the call. This method is implemented by program instructions that are stored in the central processor of a toll switching office and with the previously-described fraud control unit in the transmit portion of the switching and permuting circuit in the TSI unit. For example, upon the receipt of a call from calling customer line 153, the incoming call is routed through switching network 201 to an outgoing trunk in a well-known manner under the control of program instructions in central processor 202 (block 401). This is accomplished by the central processor assigning or allocating two unidirectional call connection paths to serve the call (block 402) and sending orders to the switching network to establish the two assigned or allocated unidirectional call connection paths through the switching network to serve the call (block 403). The established transmit path provides for the transmission of communications from the calling to the called line, whereas the established receive path provides for the transmission of communications from the called line towards the calling line.

The central processor then disables communications on the transmit path from the calling to the called line by sending a separate disable order to the busy/idle memory map of selector controller 312 to indicate an idle state to selector 311 for indicated transmit path 255 (block 404). The established receive path is maintained in a communicative state to facilitate the transmission of call progress signals to the calling line (block 405). Sensing the idle state, selector control 312 directs selector 311 to direct and insert idle code from generator 310 into buffer memory 303 for transmission to the called line. The idle code inserted on the transmit path is sent to the calling line and maintains the path in a noncommunicative state (block 405). The separate disable order does not interfere with any of the normal call processing routines executed by the processor and avoids the need for executing two sets of orders to set up separate transmit and receive paths at different times.

The toll office normally waits for valid answer supervision from the called line for the call and continues to maintain the transmit path in a noncommunicative state until answer supervision is received for the call. When valid answer supervision is received from the called line, the central processor removes the disabling of communications on the transmit path by simply sending an order to set the busy/idle memory map of selector control 312 to a busy state for the transmit path (block 407). The selector for the associated transmit path then inserts the communications on transmit line 256 from the caller into buffer memory 303 for transmission to the called line. The withdrawal or removal of idle code from the transmit path causes the transmit path to enter a communicative state where caller communications pass freely from the calling to the called line. When valid answer supervision is not returned, the transmit path remains in a noncommunicative state which will typically cause the caller to hang up.

As an alternative method of preventing fraudulent calls through the network, the central processor may be programmed in a well-known manner to first establish a receive path from the called to the calling line to allow normal call progress signals to be heard by the caller. When answer supervision is returned from the called line, the central processor sends a second set of orders to the switching network to set up a separate transmit path from the calling to the called line to complete the two-way communication. This method requires additional programming instructions and real time on the part of the central processor, but is an alternative to the previously described method of and system for preventing calls from completing through a toll switching system office until answer supervision is received for the call.

It is to be understood that the above-described system and method for preventing fraudulent calls from completing through a switching network is merely an illustrative embodiment of the principles of this invention and that numerous other methods and apparatus may be devised by those skilled in the art. In particular, the communications on the transmit path may be disabled at each switching system which is utilized to complete a four-wire call connection between a called and a calling line. Furthermore, one of the switching systems such as the terminating toll office may be designated to only disable communications on the transmit path at that switch while the other switching systems complete a call in a normal fashion. While the illustrative embodiment discloses disabling communications on the transmit path or maintaining the transmit path in a noncommunicative state until answer supervision is received, the receive path may be disabled instead of or in combination with the transmit path of a four-wire call connection.

What is claimed is:

1. A communication switching system responsive to a receipt of a call for establishing a call connection between a calling and a called line, comprising:
    means for automatically disabling communications over said connection subsequent to the establishment thereof and
    means activated thereafter and following a receipt of a prescribed supervisory signal from said called line for removing said disabling of said communications over said call connection.

2. A method of processing a telephone call to a called line over a call connection having established transmit and receive portions in a switching system office for said call comprising:
    maintaining said established receive portion of said call connection in said office in an communicative state and
    placing said established transmit portion thereof automatically in a noncommunicative state until after said office receives a prescribed supervisory signal from said called line for said call.

3. The method of claim 2 wherein placing said established transmit portion of said call connection in said noncommunicative state includes inserting into said established transmit portion of said call connection an idle code signifying said noncommunicative state.

4. The method of claim 3 further comprising withdrawing the inserting of said idle code into said established transmit portion of said call connection in response to a receipt of said prescribed supervisory signal for said call.

5. The method of claim 2 further comprising placing said established transmit portion of said call connection into a communicative state in response to a receipt of said prescribed supervisory signal for said call.

6. A program-controlled switching system comprising:
    means responsive to a receipt of a call from a calling line to a called line for temporarily precluding transmission of communications from one of said lines for said call while permitting communications from the other of said lines for said call, and means subsequently responsive to a valid call answer signal from said called line for controlling said precluding means to enable transmission of communications from said one of said lines.

7. A switching system office comprising:
separate unidirectional transmit and receive communication paths;
processor means responsive to a receipt of a call for assigning transmit and receive paths for serving said call; and
means controlled by said processor means for maintaining said transmit path in a noncommunicative state and said receive path in a communicative state following said assigning thereof and prior to a receipt of a prescribed supervisory signal for said call.

8. The system of claim 7 wherein said maintaining means comprises means for generating an idle code signifying said noncommunicative state and selector means selectively operable for directing said idle code onto said transmit path.

9. The system of claim 8 wherein said maintaining means further comprises selector control means for operating said selector to direct said idle code onto said transmit path following said assigning.

10. The system of claim 9 wherein said selector control means is responsive to the receipt of said prescribed supervisory signal for operating said selector means to withdraw said idle code from said transmit path and place said transmit path in a communicative state.

11. The system of claim 7 wherein said processor means includes means responsive to a receipt of said prescribed supervisory signal for controlling a placing of said transmit path into a communicative state.

12. A communications switching system comprising:
time slot interchange means selectively operable for allocating a unidirectional transmit path and a unidirectional receive path for a calling and a called line, and
processor means responsive to a receipt of a call for operating said time slot interchange means for allocating said transmit and receive paths to said call and subsequently disabling communications over said allocated transmit path until a prescribed supervisory signal is received for said call.

13. The system of claim 12 wherein said time slot interchange means includes means under the control of said processor means for disabling said communications over said transmit path subsequent to said allocating thereof.

14. The system of claim 13 wherein said processor means is responsive to a receipt of said prescribed supervisory signal for restoring said communications over said allocated transmit path.

15. The system of claim 13 wherein said disabling means includes means for generating an idle code signifying a noncommunicative state, selector means selectively operable for directing said idle code onto said transmit path to said called line, and selector control means under the control of said processor means for controlling the operation of said selector means.

16. A communications switching system comprising:
network means operable for establishing a first unidirectional path and a second unidirectional path for a calling an a called line, and
processor means responsive to a receipt of a call for operating said network means to establish said first path from said called to said calling line; said processor means being responsive to a receipt of a prescribed supervisory signal from said called line following the establishment of said first path for operating said network means to establish said second path from said calling to said called line.

17. A method of processing calls over unidirectional paths in a switching system office comprising:
establishing only one of said unidirectional paths between called and calling lines in response to a receipt of a call originated on said calling line; and
establishing another one of said unidirectional paths between said calling and said called lines in response to a receipt of a prescribed supervisory signal from said called line following said establishing of said only one of said paths between said called and calling lines.

18. A method of processing calls over a telephone call connection having a transmit and a receive portion in a switching system office comprising:
establishing said call connection in said office to interconnect a calling and a called line in response to a receipt of a call from said calling line, and
disabling communications over said transmit portion of said call connection following the establishing of said call connection and until a receipt of a prescribed supervisory signal from said called line for said call.

19. The method of claim 18 further comprising removing the disabling of communications over said transmit portion of said call connection in response to the receipt of said prescribed supervisory signal for said call.

20. The method of claim 18 wherein the disabling of communications over said transmit portion of said call connection includes inserting on said transmit path an idle code signifying a noncommunicative state of said transmit portion.

21. A switching system comprising:
a first and a second unidirectional communication path;
processor means responsive to a receipt of a call to a called line for assigning said first and second paths for serving said call; and
means under the control of said processor means for disabling communications over one of said first and second paths following said assigning and prior to a receipt of a prescribed supervisory signal from said called line.

22. A switching system comprising
a first and a second unidirectional communication path;
processor means responsive to a receipt of a call to a called line for assigning said first and second paths for serving said call; and
means effective following said assigning and prior to a receipt of a prescribed supervisory signal from said called line for precluding a transmission of supervisory signals over one of said assigned paths.

23. A switching system office comprising:
a first and a second unidirectional communication path;
processor means responsive to a receipt of a call to a called line for assigning said first and second paths for serving said call; and
means effective following said assigning and prior to a receipt of a prescribed supervisory signal from said called line for precluding communications on a prescribed one of said paths until after said prescribed supervisory signal is received.

24. For use in a switching system, apparatus comprising:
- first means operable for transmitting signals in first and second directions between calling and called lines and
- means effective prior to receipt of a prescribed supervisory signal for controlling said first means for precluding transmission of said signals in one of said directions, while permitting transmission of said signals in the other of said directions, until said prescribed supervisory signal is received.

25. A switching system comprising:
- first means operable for transmitting signals in first and second directions between calling and called lines,
- second means responsive to a call for assigning said first means for serving said call; and means and
- means effective following said assigning by said second prior to receipt of a prescribed signal in said first direction for controlling said first means for precluding transmission of said signals in one of said directions while permitting transmission of said signals in the other of said directions.

* * * * *

UNITED STATES PATENT AND TRADEMARK OFFICE
CERTIFICATE OF CORRECTION

PATENT NO. : 4,811,378

DATED : March 7, 1989

INVENTOR(S) : Richard L. Else, Kenneth D. Frantzen

It is certified that error appears in the above-identified patent and that said Letters Patent is hereby corrected as shown below:

Column 8, claim 2, line 42, delete "an" and substitute --a--.

Column 9, claim 16, line 65, delete "an" and substitute --and--.

Column 12, claim 25, line 6, delete "means and".

Column 12, claim 25, line 8, before "prior" insert --means and--.

Signed and Sealed this

Twenty-ninth Day of May, 1990

Attest:

HARRY F. MANBECK, JR.

*Attesting Officer*     *Commissioner of Patents and Trademarks*